US008643617B2

(12) United States Patent
Kim et al.

(10) Patent No.: US 8,643,617 B2
(45) Date of Patent: Feb. 4, 2014

(54) METHOD FOR ALLOCATING/ARRANGING KEYS ON TOUCH-SCREEN, AND MOBILE TERMINAL FOR USE OF THE SAME

(75) Inventors: Tae Hun Kim, Incheon-si (KR); Jee Young Cheon, Seoul (KR); Yeon Woo Park, Seoul (KR); Sang Hyuck Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/212,106

(22) Filed: Aug. 17, 2011

(65) Prior Publication Data
US 2011/0300912 A1 Dec. 8, 2011

Related U.S. Application Data

(62) Division of application No. 11/561,272, filed on Nov. 17, 2006, now Pat. No. 8,059,100.

(30) Foreign Application Priority Data

Nov. 17, 2005 (KR) .................. 10-2005-0110381
Dec. 29, 2005 (KR) .................. 10-2005-0134095

(51) Int. Cl.
G06F 3/041 (2006.01)

(52) U.S. Cl.
USPC ........................................ 345/173

(58) Field of Classification Search
USPC .................................. 345/156–175
See application file for complete search history.

(56) References Cited

U.S. PATENT DOCUMENTS

| | | | | |
|---|---|---|---|---|
| 5,467,102 A | * | 11/1995 | Kuno et al. | 345/1.3 |
| 6,295,052 B1 | * | 9/2001 | Kato et al. | 345/179 |
| 7,088,340 B2 | | 8/2006 | Kato | |
| 7,126,587 B2 | | 10/2006 | Kawakami et al. | |
| 7,188,313 B2 | * | 3/2007 | Hughes et al. | 715/263 |
| 7,199,786 B2 | | 4/2007 | Suraqui | |
| 7,484,173 B2 | * | 1/2009 | Gao et al. | 715/741 |
| 2002/0054120 A1 | * | 5/2002 | Kawano et al. | 345/773 |
| 2003/0182558 A1 | * | 9/2003 | Lazzaro et al. | 713/183 |
| 2004/0067761 A1 | * | 4/2004 | Pyhalammi et al. | 455/466 |
| 2004/0183834 A1 | * | 9/2004 | Chermesino | 345/773 |
| 2005/0024341 A1 | | 2/2005 | Gillespie et al. | |
| 2005/0041045 A1 | * | 2/2005 | Plut | 345/660 |
| 2005/0225540 A1 | | 10/2005 | Kawakami et al. | |
| 2005/0251731 A1 | * | 11/2005 | Valderas et al. | 715/500 |

FOREIGN PATENT DOCUMENTS

| | | |
|---|---|---|
| JP | 07-295748 | 11/1995 |
| JP | 2002-032176 | 1/2002 |
| JP | 2005-050265 | 2/2005 |
| KR | 20-0187702 | 7/2000 |
| KR | 10-2001-0054523 | 7/2001 |
| KR | 10-2002-0014348 | 2/2002 |
| KR | 10-2003-0046660 | 6/2003 |
| KR | 10-0455160 | 11/2004 |

* cited by examiner

Primary Examiner — William Boddie
Assistant Examiner — Carolyn R Edwards
(74) Attorney, Agent, or Firm — Lee, Hong, Degerman, Kang & Waimey

(57) ABSTRACT

A method for allocating/arranging keys on a touch-screen and a mobile terminal for the same are disclosed. The method for allocating at least one key on a touch-screen includes establishing a plurality of sensing zones on the touch-screen, wherein sizes of the plurality of sensing zones change in sequential order according to a key-arrangement direction, and allocating the at least one key to at least one of the plurality of sensing zones.

12 Claims, 18 Drawing Sheets

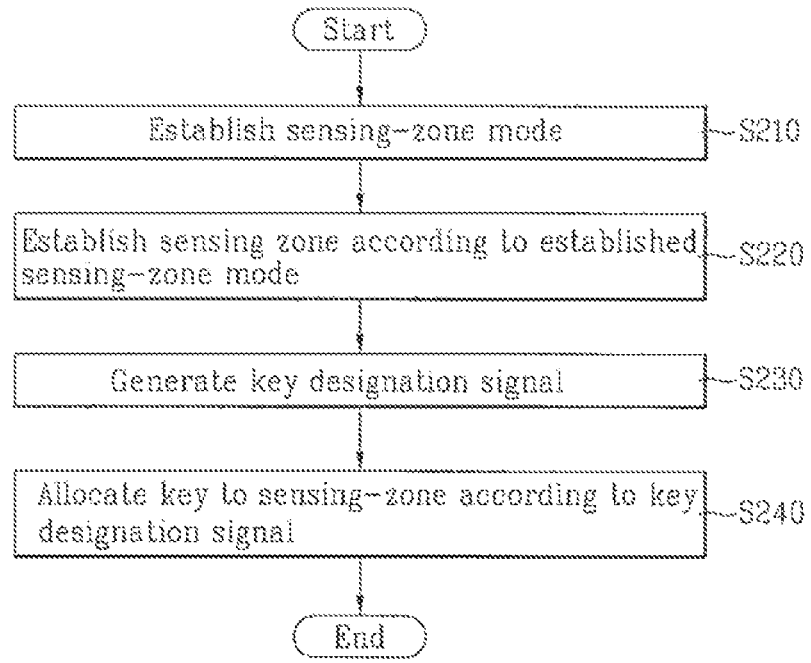
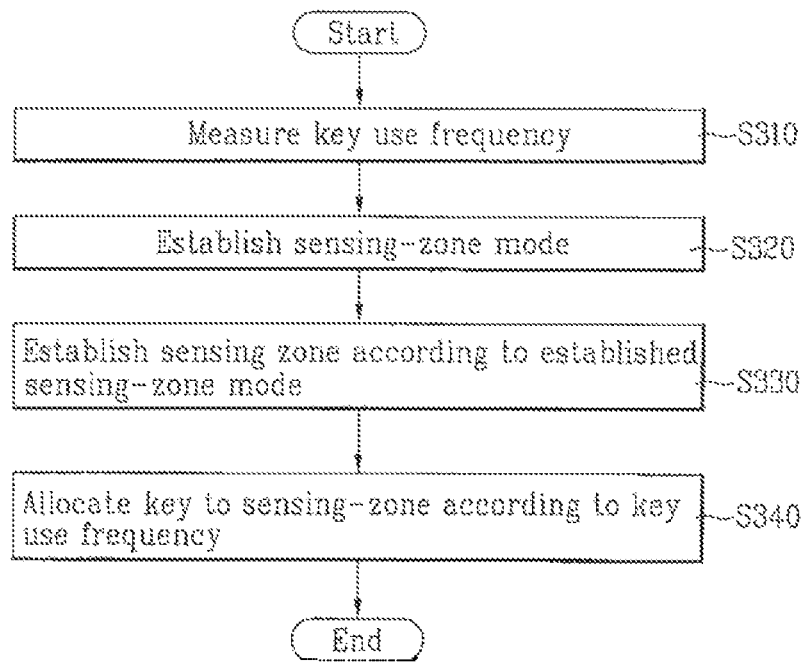

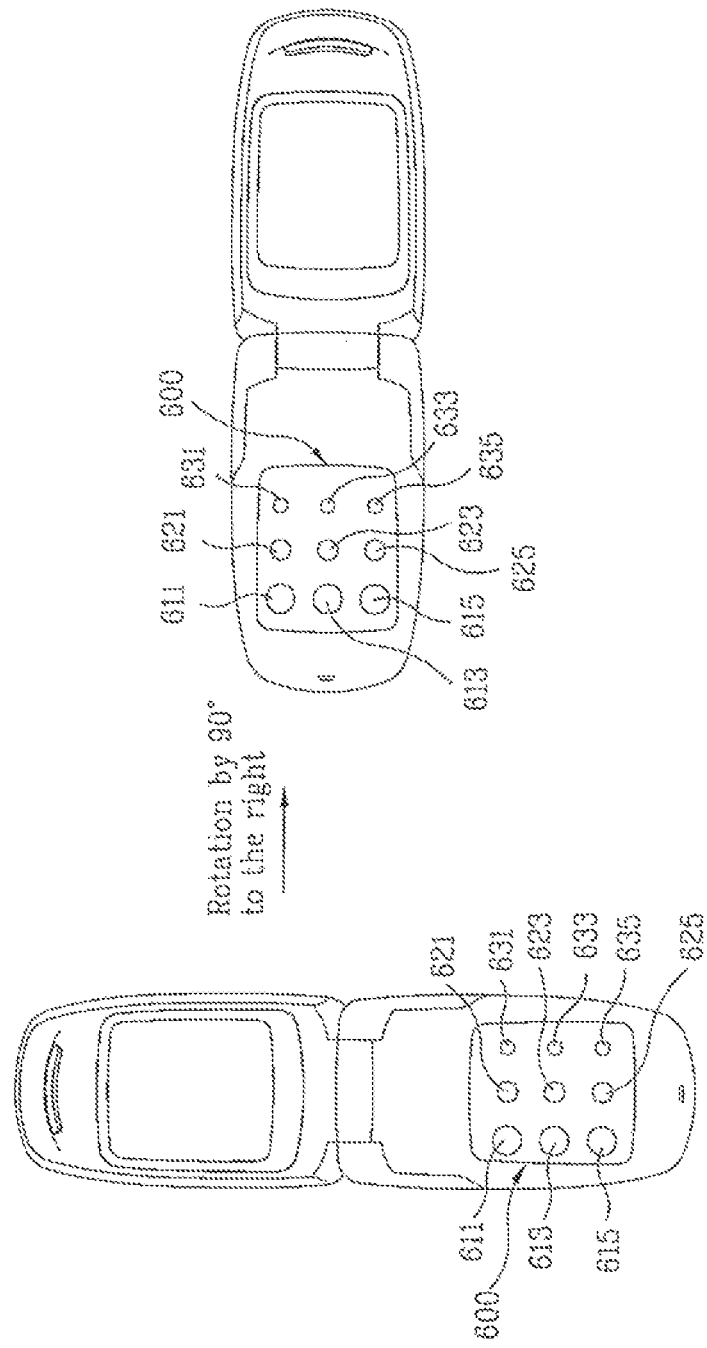

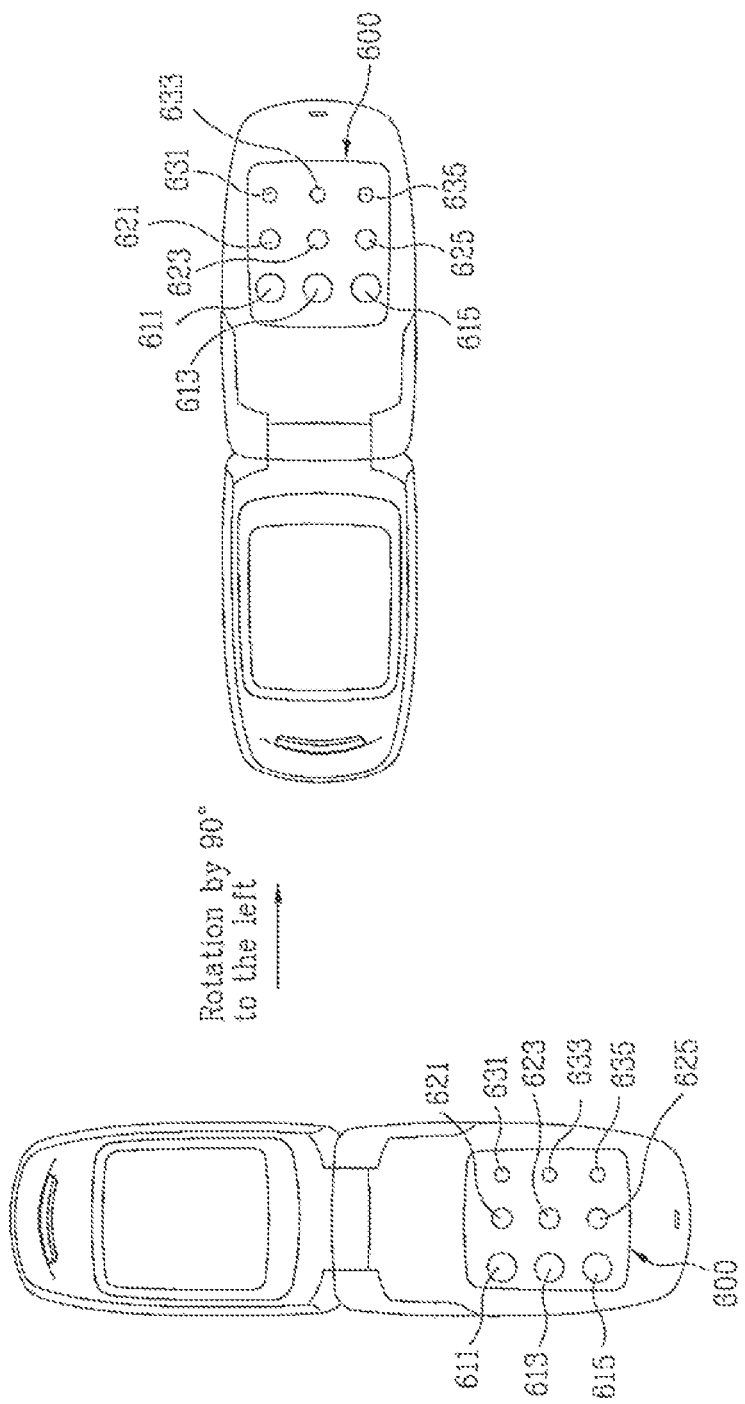

METHOD FOR ALLOCATING/ARRANGING KEYS ON TOUCH-SCREEN, AND MOBILE TERMINAL FOR USE OF THE SAME

CROSS-REFERENCE TO RELATED APPLICATIONS

This application is a divisional of U.S. patent application Ser. No. 11/561,272, Nov. 17, 2006, now U.S. Pat. No. 8,059,100, which claims the priority benefit of earlier filing date and right of priority to Korean Patent Applications Nos. 10-2005-0110381, filed on Nov. 17, 2005 and 10-2005-0134095, filed on Dec. 29, 2005, the contents of which are hereby incorporated by reference herein in their entirety.

BACKGROUND OF THE INVENTION

1. Field of the Invention

The present invention relates to a mobile terminal, and more particularly to a method for allocating/arranging keys on a touch-screen of a mobile terminal, and the mobile terminal for use of the same.

2. Discussion of the Related Art

Generally, a touch-screen is configured with a touch-panel on a general monitor screen. By touching a displayed character or a specific location on the touch-screen, a specific operation corresponding to the touch is executed with the aid of a software program.

The touch-screen can be classified into a variety of touch-screens. For example, a capacitance-type touch-screen, an infrared (IR)-type touch-screen, a resistance-type touch-screen, and an ultrasound-type touch-screen.

However, a plurality of sensing zones, allocated to menus or functions, are displayed on the touch-screen. Here, the sensing zones are areas on the touch-screen which can be recognized when touched by a user. Generally, the surface area and area allocated to the sensing zones (e.g., size of the sensing zones) are equal to each other. Moreover, a size of the sensing zone can be represented by a default size, which does not take into consideration the habitual- or usual-keypad usages of the user.

With improvements in touch-screen technology, and more specifically, with providing the touch-screen feature to a mobile terminal, if the user touches a specific menu or a function displayed on the touch-screen of the mobile terminal, the user can easily make a desired selection from a plurality of menus or functions displayed on the touch-screen of the mobile terminal. Moreover, the user can touch a specific key-button from several key-buttons displayed on the touch-screen to view the data corresponding to the touched selection.

In the conventional mobile terminal equipped with the touch-screen capability, the key-buttons displayed on the touch-screen are uniformly arranged according to a predetermined arrangement structure. As a result, the touch-screen does not consider needs or convenience of the user who desires to use the above-mentioned key-buttons.

SUMMARY OF THE INVENTION

Accordingly, the present invention is directed to a method for allocating/arranging keys on a touch-screen and a mobile terminal for use of the same that substantially obviate one or more problems due to limitations and disadvantages of the related art.

An object of the present invention is to provide a method for allocating keys on a touch-screen in various ways, and a mobile terminal for use of the same.

Another object of the present invention is to provide a method for allowing a user to freely establish a plurality of sensing zones to which several keys displayed on a touch-screen are allocated, and a mobile terminal for use of the same.

Yet another object of the present invention is to provide a method for allocating several keys to several sensing zones having different size according to arrangement direction, and a mobile terminal for use of the same.

Yet another object of the present invention is to provide a method for arranging several keys on a touch-screen according to a user-desired arrangement structure, and a mobile terminal for use of the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for allocating at least one key on a touch-screen comprises establishing a plurality of sensing zones on the touch-screen, wherein the plurality of sensing zones which change sizes in sequential order according to a key-arrangement direction, and allocating the at least one key to at least one of the plurality of sensing zones.

In another aspect of the present invention, there is provided a method for arranging keys on a touch-screen comprising establishing an arrangement structure for arranging a plurality of keys on the touch-screen, arranging the keys on the touch-screen according to the established arrangement structure, and displaying the arranged keys.

In yet another aspect of the present invention, there is provided a mobile terminal comprising a storage unit for storing data associated with sensing zones, a controller for allocating at least one key to at least one sensing zone from a plurality of sensing zones, wherein the sensing zones, having varying sizes, sequentially change according to a key-arrangement direction; and a touch-screen for displaying the at least one key allocated to the at least one sensing zone.

In yet another aspect of the present invention, there is provided a mobile terminal comprising a touch-screen, a storage unit for storing a plurality of arrangement structures for arranging a plurality of keys on the touch-screen, and a controller for establishing a arrangement structure from the stored arrangement structures, and controlling the touch-screen to display the keys arranged according to the established arrangement structure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a flow chart illustrating a method for allocating keys on a touch-screen according to a first preferred embodiment of the present invention;

FIG. 3 is a flow chart illustrating a method for allocating keys on a touch-screen according to a second preferred embodiment of the present invention;

FIG. 6A shows the appearance of keys allocated to sensing zones of a rotating touch-screen according to a first preferred embodiment of the present invention;

FIG. 6B shows the appearance of keys allocated to sensing zones of a rotating touch-screen according to a second preferred embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
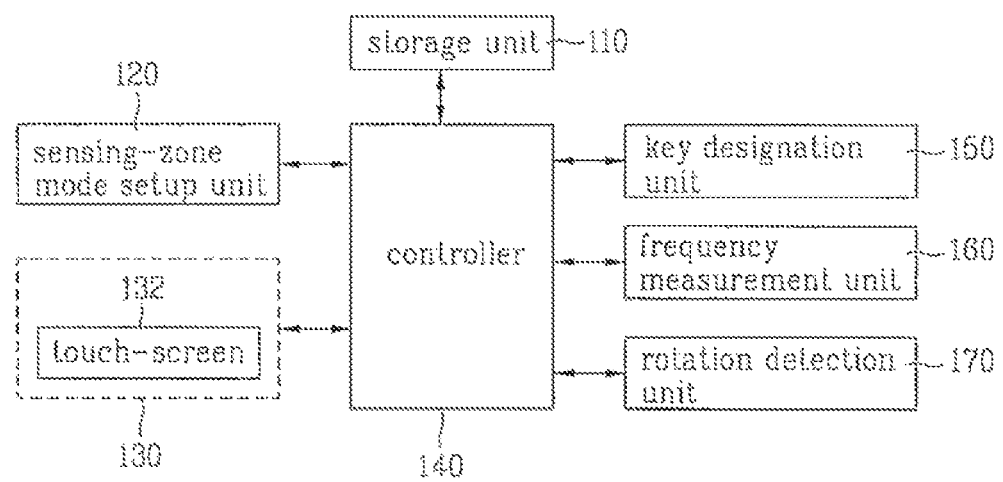
FIG. 1 is a block diagram illustrating a mobile terminal for allocating keys on a touch-screen according to the present invention.

FIG. 1 is a block diagram illustrating a mobile terminal for allocating keys on a touch-screen according to the present invention.

Referring to FIG. 1, the mobile terminal includes a storage unit 110, a sensing-zone mode setup unit 120, a display 130, a controller 140, a key designation unit 150, a frequency measurement unit 160, and a rotation detection unit (also called a "rotation sensing unit") 170. Moreover, the display 130 includes a touch-screen 132.

More specifically, the storage unit 110 stores data associated with sensing zones (hereinafter referred to as "sensing-zone associated data").

In this case, the sensing-zone associated data indicates not only a program required for establishing several sensing zones on the touch-screen 132, but also data related to a key-arrangement direction and a size of sensing zone based on each sensing-zone mode.

The sensing-zone mode setup unit 120 establishes a sensing-zone mode for determining a size of each sensing zone according to a key-arrangement direction.

For example, if a plurality of sensing-zone modes, which can be established by the user, are displayed on the touch-screen 132, the user may select a desired sensing-zone mode from the displayed plurality of sensing-zone modes.

The sensing-zone mode setup unit 120 can sequentially increase the size of each sensing zone in either a horizontal key-arrangement direction or a vertical key-arrangement direction according to the established sensing-zone mode. In this case, it should be noted that the key-arrangement direction is not limited to the above-mentioned horizontal- or vertical-key-arrangement direction, and may include all the available directions.

The display 130 displays a plurality of keys allocated to the plurality of sensing zones via the touch-screen 132. Here, the controller 140 allocates at least one key to at least one sensing zone from the plurality of sensing zones whose size changes sequentially according to the key-arrangement direction.

For example, while maintaining a general arrangement structure of several key-buttons to which numerals, characters, and special characters (e.g., #,*) are allocated, the controller 140 can allocate the key-buttons to the individual sensing zones, respectively. As such, the display 130 allows the touch-screen 132 to display the key pad in which a variety of keys are arranged according to the general key-button arrangement structure.

The key designation unit 150 generates a key-designation signal. Here, the controller 140 allocates a specific key to a specific sensing zone from the sensing zones available according to the generated key designation signal.

The frequency measurement unit 160 measures or counts frequency of specific-key use. Here, the controller 140 receives the use frequency of the specific key from the frequency measurement unit 160, and allocates a specific key having the highest use frequency to the largest sensing zone upon receiving the use frequency of the specific key from the frequency measurement unit 160.

The rotation detection unit 170 detects the degree of rotation of the touch-screen 132 and the direction of the touch-screen's rotation. Here, the controller 140 changes the key-arrangement direction of the plurality of sensing zones according to the detected rotation degree and the detected rotation direction. Here, the controller 140 maintains keys allocated to the individual sensing zones.

A method for allocating keys on a touch-screen according to a first preferred embodiment of the present invention will hereinafter be described with reference to FIGS. 1 and 2.

FIG. 2 is a flow chart illustrating a method for allocating keys on a touch-screen according to a first preferred embodiment of the present invention.

The sensing-zone mode setup unit 120 establishes a sensing-zone mode for determining the size of individual sensing zones from the plurality of sensing zones according to a predetermined input signal (S210).

In this case, the sensing-zone mode indicates a specific mode for sequentially changing the size(s) of the sensing zones according to key-arrangement direction of the sensing zones.

For example, step S210 may establish a specific sensing-zone mode from several available sensing-zone modes based on the selection of the user. Step S210 may set a default sensing-zone mode, even if there is no input signal from the user, based on a default sensing zone mode provided in the mobile terminal.

The controller 140 establishes a sensing zone according to the established sensing-zone mode (S220). For example, step S220 may configure a multiple sensing zones whose sizes increase sequentially in a horizontal key-arrangement direction according to the established sensing zone mode. Here, the sizes of the sensing zones located in the same column may be equal to each other.

Further, step S220 may establish a plurality of sensing zones whose sizes increase sequentially in a vertical key-arrangement direction according to the established sensing zone mode. Here, the sizes of the sensing zones located in the same row can be equal to each other.

Step S220 may establish a plurality of sensing zones whose sizes increase sequentially in a diagonal key-arrangement direction according to the established sensing zone mode. Here, the sizes of the sensing zones located in the same diagonal line from a plurality of diagonal lines perpendicular to the diagonal key-arrangement direction can be equal to each other.

Further, step S220 may establish a plurality of sensing zones whose sizes increase sequentially in a key-arrangement direction from both edge columns to the center column according to the established sensing zone mode. Here, the sizes of the sensing zones located in the same column can equal to each other.

Step S220 may establish a plurality of sensing zones whose sizes increase sequentially in a key-arrangement direction from the center column to both edge columns according to the established sensing zone mode. Here, the sizes of the sensing zones located in the same column can be equal to each other.

Step S220 may establish a plurality of sensing zones whose sizes increase sequentially in a key-arrangement direction from both edge rows to the center row according to the established sensing zone mode. Here, the sizes of the sensing zones located in the same row can be equal to each other.

Step S220 may establish a plurality of sensing zones whose sizes increase sequentially in a key-arrangement direction from the center row to both edge rows according to the established sensing zone mode. Here, the size of the sensing zones located in the same row can be equal to each other.

The key designation unit 150 generates a key designation signal (S230). The key designation signal indicates a specific signal for allocating a specific key from the plurality of keys to a specific sensing zone from the sensing zones whose sizes are determined according to the established sensing-zone mode.

Step S230 may generate the key designation signal according to a user selection signal.

For example, step S230 may generate the key designation signal capable of designating a various keys (e.g., a message key, a menu-selection key, and an Internet execution key) in sequential order based on sensing zones having a larger size according to the user selection signal. Further, the message key is allocated to the sensing zone having the largest size, the menu-selection key is allocated to the sensing zone having a smaller size, and the Internet execution key is allocated to the sensing zone having the smallest size.

Step S230 may generate the key designation signal according to a key designation reference pre-set or programmed in the mobile terminal.

For example, the key designation signal capable of designating at least one of the menu-selection key and the hot key at the sensing zone having the largest size according to the key designation reference may be generated at step S230. Here, the largest-size sensing zone may be composed of one or more sensing zones. Moreover, the key designation reference may be freely changed or set by the user in various ways.

Step S230 may be used to generate the key designation signal for assigning a specific key to which a default zone having the largest-size sensing zone is designated. Moreover, the specific key is a key which is expected to be most frequently used by the user.

Further, step S230 may be used to generate another key designation signal for designating the remaining keys to the remaining sensing zones according to the order of the expected use frequency. The higher the expected use frequency, the larger the size of the sensing zone. The use frequency refers to how frequent or how often a user touches the sensing zone or makes selection using the sensing zone.

Step S230 maintains a general keypad arrangement structure. Further, a key designation signal capable of designating a plurality of key buttons at a plurality of sensing zones may be generated at step S230. Here, the keypad may include a plurality of key buttons to which numerals, characters, and special characters (*, #) are allocated.

The controller 140 allocates a specific key to a specific sensing zone from the sensing zones according to the generated key designation signal (S240).

A method for allocating keys on a touch-screen according to a second preferred embodiment of the present invention will hereinafter be described with reference to FIGS. 1 and 3. FIG. 3 is a flow chart illustrating a method for allocating keys on a touch-screen according to a second preferred embodiment of the present invention.

Referring to FIGS. 1 and 3, the frequency measurement unit 160 measures the use frequency of a specific key (S310). In other words, the frequency measurement unit 160 counts the number of use frequencies of each key.

The frequency measurement unit 160 measures the use frequency of each key displayed on the touch-screen 132, and/or measures the use frequency of the keys provided on the mobile terminal. Here, the key may be used to enter a command for executing a desired menu or function, or may be used to enter a desired character or number.

For example, the use frequency during a predetermined period of time can be measured at step S310. Here, the predetermined period may be set by the user or may be pre-established or pre-programmed in the mobile terminal.

The sensing-zone mode setup unit 120 establishes a sensing-zone mode for determining the size of individual sensing zones (S320). Step S320 of FIG. 3 is equal to step S210 of FIG. 2, and as such, a detailed description of step S320 will herein be omitted for the convenience of description.

The controller 140 establishes the sensing zone according to the established sensing-zone mode (S330). Step S330 of FIG. 3 is equal to step S220 of FIG. 2, as such, a detailed description of step S330 will herein be omitted for the convenience of description.

The controller 140 receives information indicating the use frequency of individual keys from the frequency measurement unit 160. Moreover, the controller 140 allocates the keys to the sensing zones having different sizes according to the received use-frequency information.

Specifically, allocation of a specific key having the highest use frequency to the largest sensing zone from the sensing zones according to use frequency information takes place (S340).

For example, provided that the use-frequency information measured during the predetermined period is arranged in the following order—the message key→the phonebook key→and the MP3 key—step S340 sequentially allocates the message key to the sensing zone having the largest size, allocates the phonebook key to the sensing zone having a smaller size, and allocates the MP3 key to the sensing zone having the smallest size. Further, step S340 receives other use-frequency information of the remaining keys other than the three keys (i.e., the message key, the phonebook key, and the MP3 key), and allocates a larger sensing zone to a key having higher use frequency information. In other words, a higher use frequency corresponds to a larger sensing zone.

Figure 4:
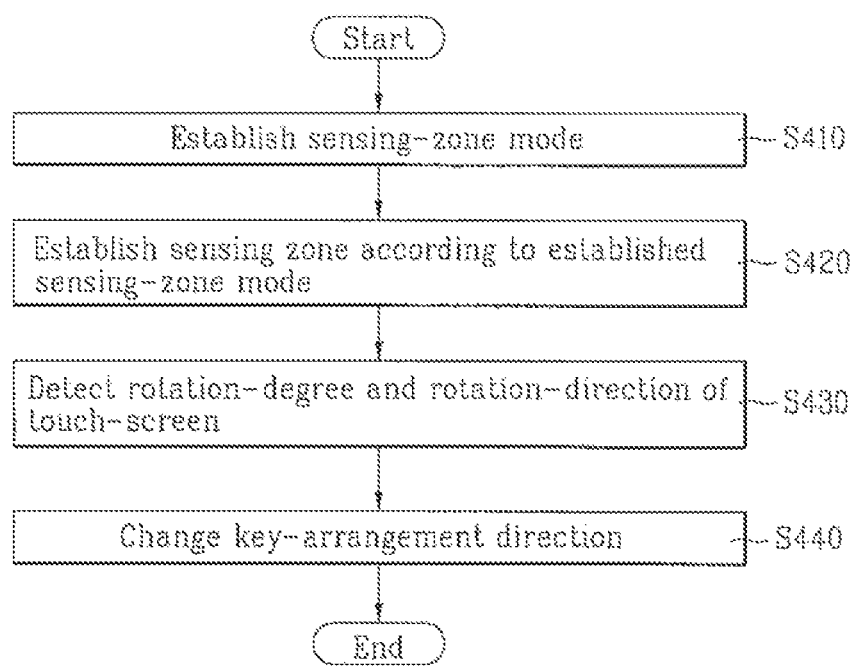
FIG. 4 is a flow chart illustrating a method for allocating keys on a touch-screen according to a third preferred embodiment of the present invention.

A method for allocating keys on a touch-screen according to a third preferred embodiment of the present invention will hereinafter be described with reference to FIGS. 1 and 4. FIG. 4 is a flowchart illustrating a method for allocating keys on a touch-screen according to a third preferred embodiment of the present invention.

Referring to FIGS. 1 and 4, the sensing-zone mode setup unit 120 establishes a sensing-zone mode for determining the size of individual sensing zones according to a predetermined input signal (S410).

Since step S410 of FIG. 4 is equal to step S210 of FIG. 2, a detailed description with respect to step S410 will herein be omitted for the convenience of description.

The controller 140 establishes the sensing zone according to the established sensing-zone mode (S420).

Since step S420 of FIG. 4 is equal to step S220 of FIG. 2, a detailed description with respect to step S420 will herein be omitted for the convenience of description.

The rotation detection unit 170 detects the degree of rotation of the touch-screen 132 and the direction of the touch-screen 132's rotation (S430).

For example, the rotation of the touch-screen 132 using a rotation sensor contained in the rotation detection unit 170 may be detected at step S430.

Here, the rotation sensor may detect at least one of a rotation degree, a rotation angle, a rotation direction, and a rotation speed.

The controller 140 can change the key-arrangement direction of the sensing zones to another direction according to the detected rotation degree and the detected rotation direction (S440). Here, the controller 140 maintains keys allocated to the sensing zones without any change.

For example, if the touch-screen 132 is rotated by a predetermined angle of 90° to the right, the key-arrangement direction of the sensing zones can be rotated by a predetermined angle of 90° to the left at step S440. A detailed description thereof will be described later with reference to FIGS. 6A~6B.

A changing speed of the key-arrangement direction of the sensing zones according to the rotation speed detected by the rotation sensor may be adjusted at step S440.

Further, the key-arrangement direction to be changed from original key-arrangement direction of the sensing zones according to the rotation speed detected by the rotation sensor can be determined at step S440.

A variety of examples illustrating a method for arranging a plurality of keys allocated to several sensing zones will hereinafter be described with reference to FIGS. 5A, 5B, 5C, and 5D.

Referring to FIGS. 5A~5D, the mobile terminal according to the present invention includes two displays, and at least one of the two displays is a touch-screen. More specifically, the display for displaying several keys allocated to several sensing zones is implemented with a touch-screen 500.

The touch-screen 500 indicates several keys allocated to several sensing zones whose size changes sequentially based on the key-arrangement direction. The touch-screen 500 displays the keys in proportion to the sizes of the sensing zones to which predetermined keys are allocated.

In more detail, if a specific key is allocated to a large-size sensing zone, the touch-screen 500 displays the specific key within a wide area. If a specific key is allocated to a small-size sensing zone, the touch-screen 500 displays the specific key within a narrow area.

Figure 5A:
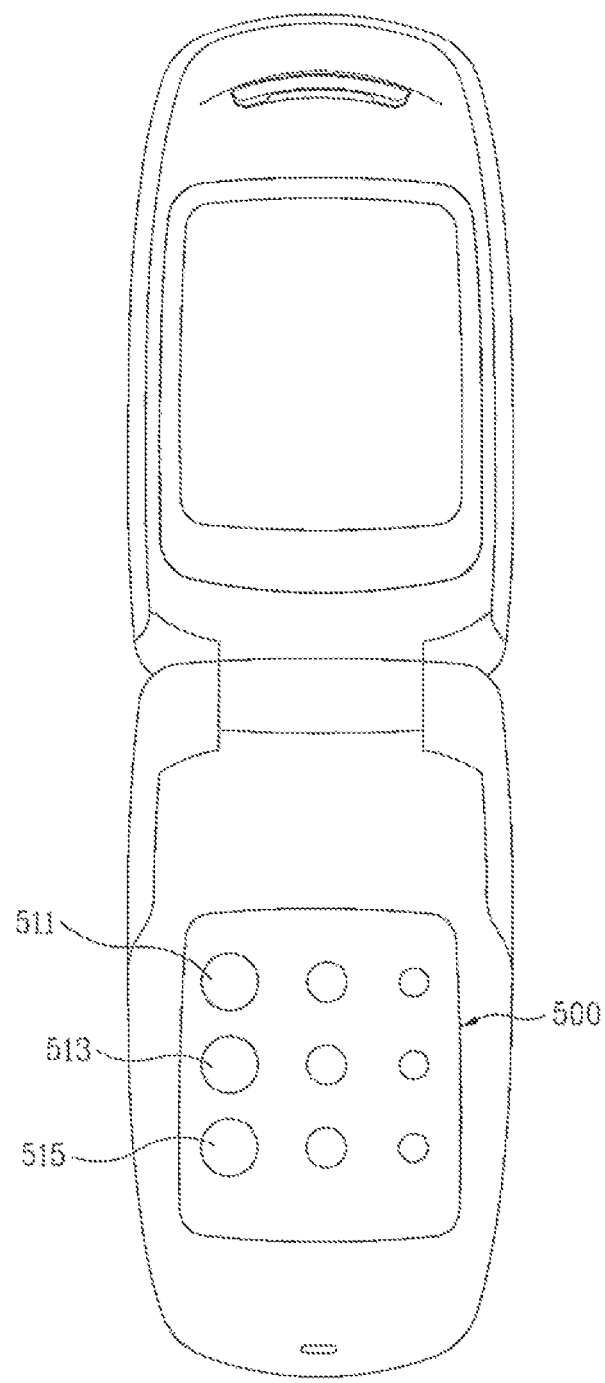
FIG. 5A shows the appearance of keys allocated to sensing zones according to a first preferred embodiment of the present invention.

FIG. 5A shows the appearance of keys allocated to sensing zones according to a first preferred embodiment of the present invention. In more detail, FIG. 5A shows the arrangement of keys allocated to a plurality of sensing zones, which sequentially increase based on sizes of the sensing zones in a horizontal key-arrangement direction from the right column to the left column.

The mobile terminal may allocate a predetermined menu- or function-key to any one of the sensing zones according to a key designation signal of the user.

The mobile terminal may sequentially allocate three keys having high use frequency to the sensing zones 511, 513, and 515. The mobile terminal may also allocate at least one of the menu selection key and the hot key to at least one of the sensing zones 511, 513, and 515.

Figure 5B:
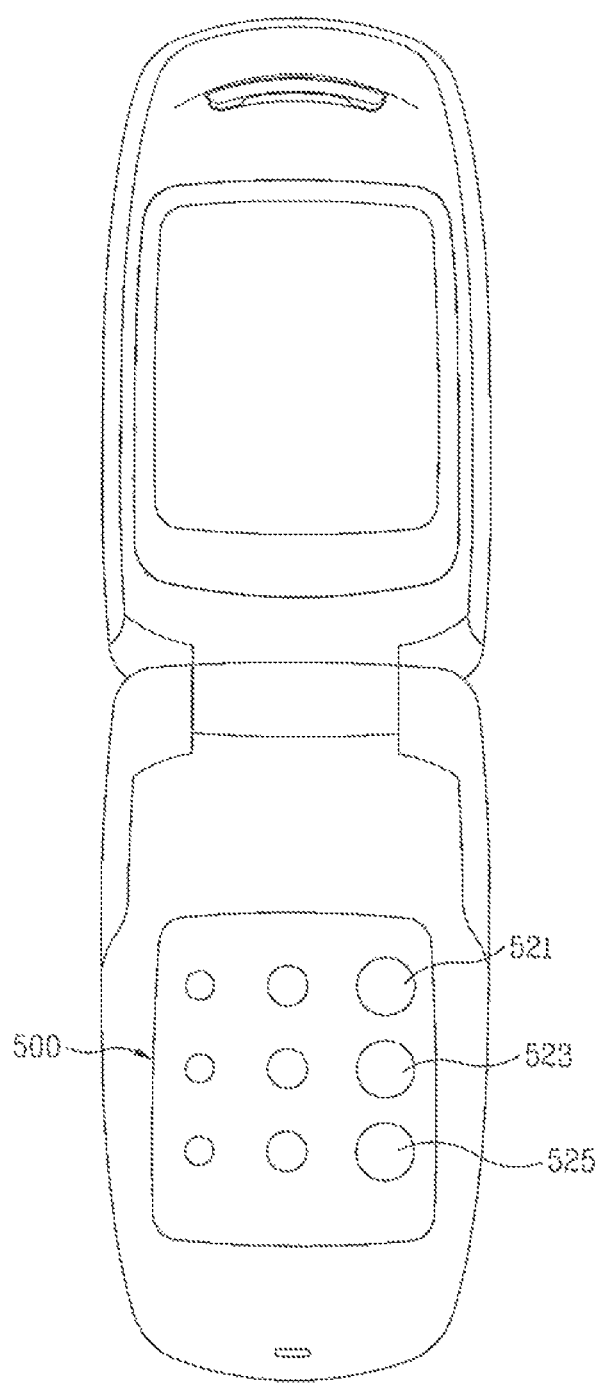
FIG. 5B shows the appearance of keys allocated to sensing zones according to a second preferred embodiment of the present invention.

FIG. 5B shows the appearance of keys allocated to sensing zones according to a second preferred embodiment of the present invention. In more detail, FIG. 5B shows the arrangement of keys allocated to a plurality of sensing zones, which sequentially increase based on sizes of the sensing zones in a horizontal key-arrangement direction from the left column to the right column.

The mobile terminal may allocate three keys having high use frequency in sequential order to the sensing zones 521, 523, and 525. The mobile terminal may also allocate at least one of the menu selection key and the hot key to at least one of the sensing zones 521, 523, and 525.

Figure 5C:
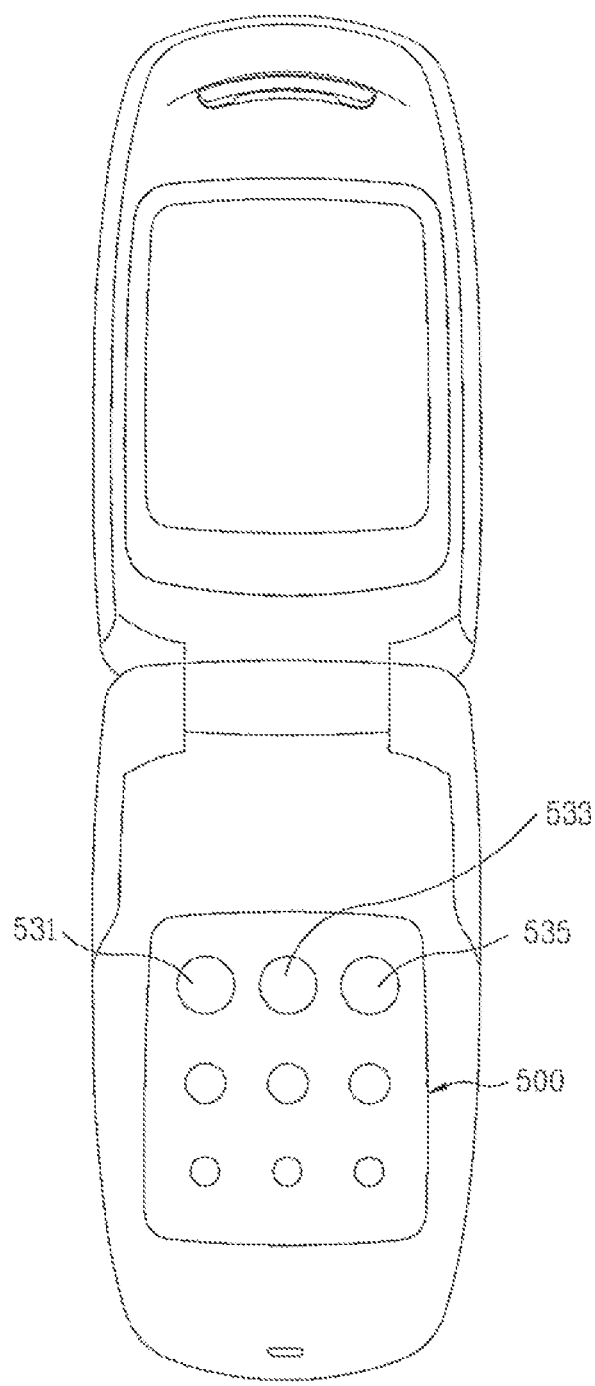
FIG. 5C shows the appearance of keys allocated to sensing zones according to a third preferred embodiment of the present invention.

FIG. 5C shows the appearance of keys allocated to sensing zones according to a third preferred embodiment of the present invention. In more detail, FIG. 5C shows the arrangement of keys allocated to sensing zones, which sequentially increase based on sizes of the sensing zones in a vertical key-arrangement direction from the bottom row to the top row of the sensing zones.

The mobile terminal may allocate three keys having high use frequency in sequential order to the sensing zones 531, 533, and 535. The mobile terminal may also allocate at least one of the menu selection key and the hot key to at least one of the sensing zones 531, 533, and 535.

Figure 5D:
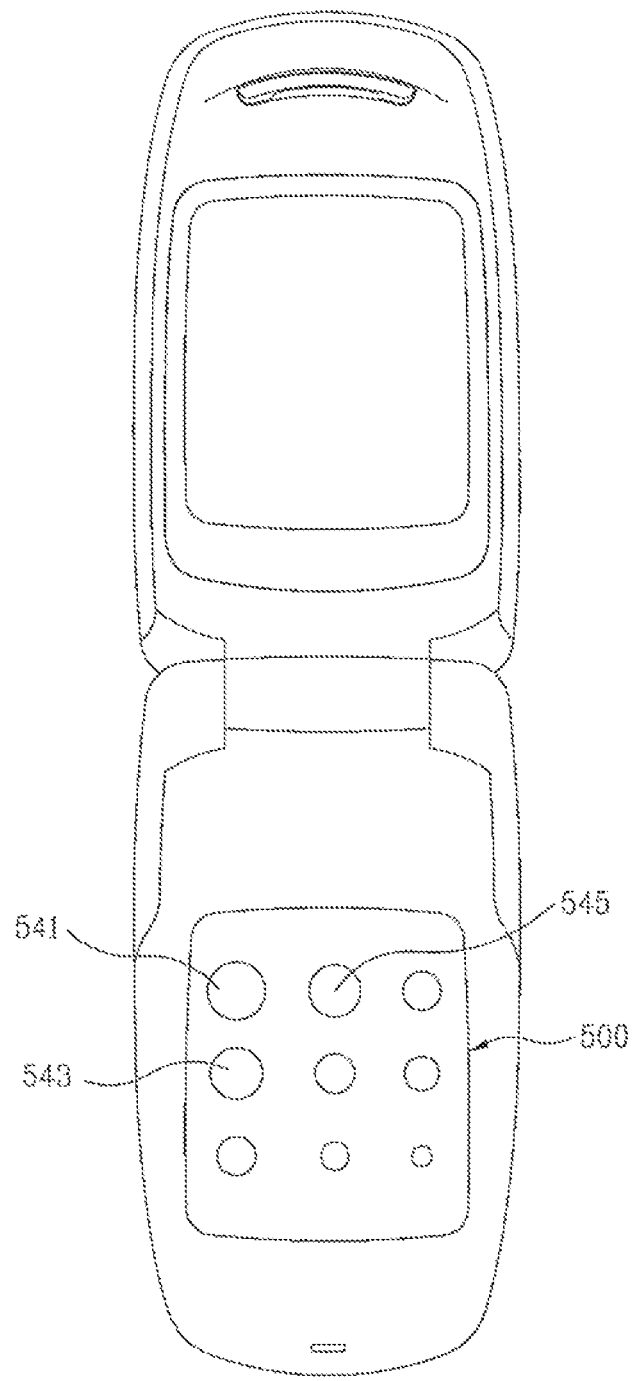
FIG. 5D shows the appearance of keys allocated to sensing zones according to a fourth preferred embodiment of the present invention.

FIG. 5D shows the appearance of keys allocated to sensing zones according to a fourth preferred embodiment of the present invention. In more detail, FIG. 5D shows the arrangement of keys allocated to the sensing zones, which sequentially increase based on sizes of the sensing zones in a diagonal key-arrangement direction of the sensing zones.

The mobile terminal may allocate a specific key having the highest use frequency to the largest-size sensing zone 541, and may allocate another key having a lower use frequency to at least one of sensing zones 543 and 545 having the second largest sensing zone in terms of size.

Moreover, the mobile terminal may allocate at least one of the menu selection key and the hot key to the largest sensing zone 541 as a default. Various examples illustrating a method for arranging several keys allocated to several sensing zones when the touch-screen is rotated will hereinafter be described with reference to FIGS. 6A~6B.

FIG. 6A shows a plurality of keys allocated to a plurality of sensing zones of a rotating touch-screen according to a first preferred embodiment of the present invention. FIG. 6B shows a plurality of keys allocated to a plurality of sensing zones of a rotating touch-screen according to a second preferred embodiment of the present invention.

Referring to FIG. 6A, if the touch-screen 600 rotates by a predetermined angle of 90° to the right, the key-arrangement direction of the sensing zones rotates by 90° to the left in order to maintain a key-arrangement direction provided to the user.

Here, the keys allocated to the sensing zones are maintained without any change. Furthermore, the sizes of the sensing zones allocated to respective sensing zones are also maintained without any change.

The mobile terminal may detect the rotation of the touch-screen 600 using the rotation sensor contained in the mobile terminal itself. The rotation sensor may detect at least one of a rotation degree, a rotation angle, a rotation direction, and a rotation speed.

Therefore, the touch-screen 600 may change overall arrangement of the plurality of sensing zones according to the rotation degree, the rotation angle, the rotation direction, or the rotation speed detected by the rotation sensor.

Similarly, referring to FIG. 6B, if the touch-screen 600 rotates by 90° to the left, the key-arrangement direction of the sensing zones rotates by 90° to the right in order to maintain a key-arrangement direction provided to the user.

Figure 7:
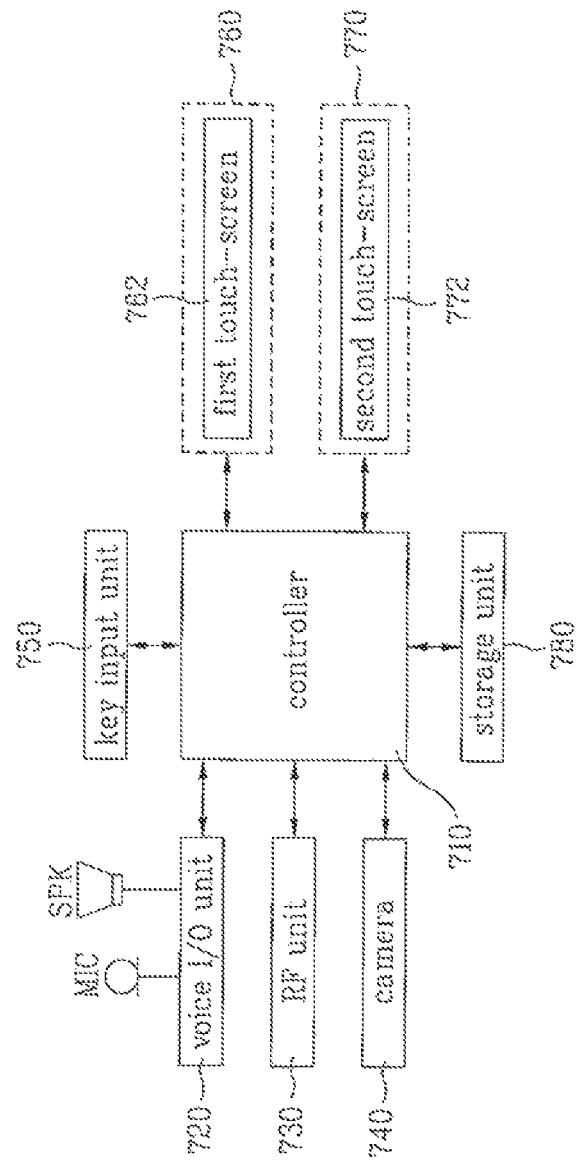
FIG. 7 is a block diagram illustrating a mobile terminal equipped with a touch-screen to which keys are arranged according to the present invention.

FIG. 7 is a block diagram illustrating a mobile terminal equipped with a touch-screen to which keys are arranged according to the present invention.

Referring to FIG. 7, the mobile terminal includes a controller 710, a voice I/O (Input/Output) unit 720, a Radio Frequency (RF) unit 730, a camera 740, a key input unit 750, a first display 760, a second display 77D, and a storage unit 780. Specifically, the first display 760 includes a first touch-screen 762, and the second display 770 includes a second touch-screen 772.

The key input unit 750 detects an input signal using a key mounted to the mobile terminal. The RF unit 730 extracts voice- or data-signals from RF signals communicated via an antenna. The voice I/O unit 720 may output a voice signal received from the RF unit 730 via a speaker or may output another voice signal received via a microphone to the RF unit 730.

The first display 760 and the second display 770 can display a variety of menus or operation states, and can also be used as input units, respectively. More specifically, the first display 760 displays a variety of information according to operations and functions of the mobile terminal. The second display 770 displays a keypad function and a display function at the same time. It should be noted that the functions of the first and second displays 760 and 770 are not limited to the above-mentioned explanation, and may also be exchanged with each other as necessary.

Further, the first display 760 may be separated from the second display 770 by hardware. The first display 760 and the second display 770 may be visually distinguished from each other on a single display. In other words, the first display 760 and the second display 770 may be configured in the form of two displays separated from each other. Here, it should be noted that a single display means may be divided into at least two display zones as necessary. The first display 760 includes the touch-screen 762, and the second display 770 includes the touch-screen 772, such that different key input functions can be executed on the touch-screens 762 and 772.

The controller 710 controls the first and second displays 760 and 770 to display a variety of information associated with operations and states of the mobile terminal. More specifically, the controller 710 controls the first and second displays 760 and 770 to generate a user-desired keypad, such that the user-desired keypad can be displayed on the first and second displays 760 and 770. Moreover, the controller 710 detects a key input signal of the user from the keypad, such that it can process the detected key input signal.

In this case, the second display 770 displays the keypad on the second touch-screen 772, such that it may detect the user's key input signal. If necessary, the first display 760 may also display the keypad instead of the second display 770.

The first touch-screen 762 may display the plurality of keys arranged according to a predetermined arrangement structure. Furthermore, the second touch-screen 772 may display the plurality of keys arranged according to the inventive arrangement structure.

Here, the controller 710 moves at least one of keys displayed on the first touch-screen 762, such that it may allocate the moved key to at least one of keys displayed on the second touch-screen 772.

The storage unit 780 stores a variety of data and algorithms capable of constructing the keypad on the touch-screens 762 and 772. More specifically, the storage unit 780 stores a variety of fonts and buttons which can be applied to the plurality of keys provided on the keypad. The storage unit 780 can store avatars, images, characters, icons or pictures which can be applied to either a background image of each key or the keypad. Furthermore, the storage unit 780 stores information indicating various arrangement structures for arranging the keys on the touch-screens 762 and 772.

The RF unit 730 transmits the arrangement-structure information to another terminal over a network, and/or receives key-arrangement information from another terminal over a network.

Here, the controller 710 may arrange the keys on at least one of the touch-screens 762 and 772 according to the key-arrangement information received from another terminal.

A method for arranging keys on a touch-screen according to a first preferred embodiment of the present invention will hereinafter be described with reference to FIGS. 7~8.

Figure 8:
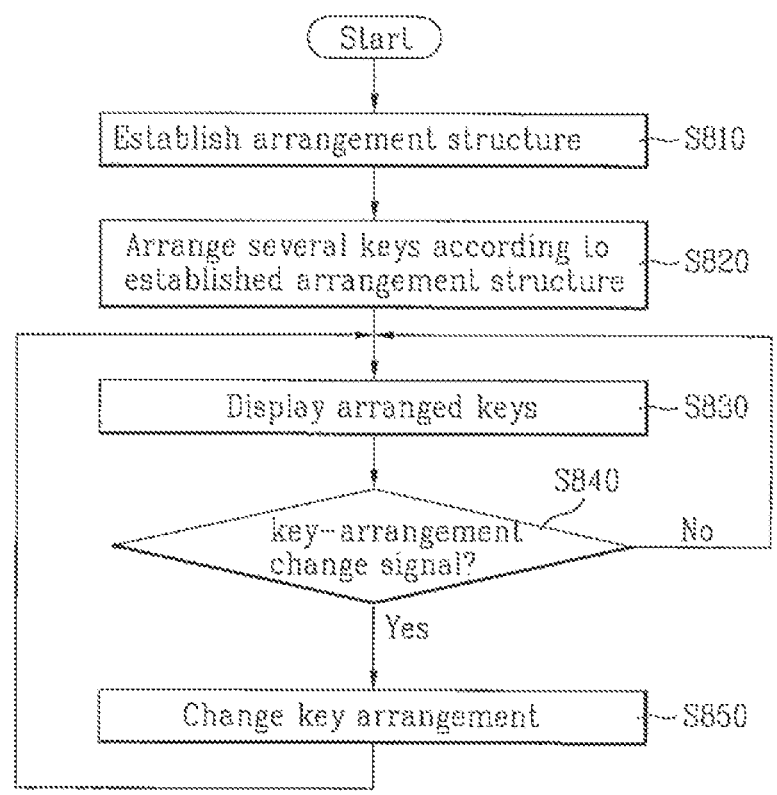
FIG. 8 is a flow chart illustrating a method for arranging keys on a touch-screen according to a first preferred embodiment of the present invention.

FIG. 8 is a flowchart illustrating a method for arranging keys on a touch-screen according to a first preferred embodiment of the present invention.

Referring to FIGS. 7~8, the controller 710 establishes an arrangement structure for arranging a plurality of keys on the second touch-screen 772 (S810).

The arrangement structure according to a user selection signal or an arrangement structure based on default setting may be established at step S810.

Since the information related to configurable arrangement structures is pre-stored in the mobile terminal, the user can select a desired arrangement structure upon receiving the arrangement structure information.

For example, the arrangement structures may indicate at least one of a matrix-type arrangement (□), a two-side-type arrangement (∥), a three-side-type arrangement (∪, ∩), a circular-type arrangement (○), and a square-type arrangement (□). The two-side-type arrangement structure (∥) arranges keys to right and left sides in the form of two straight lines. The three-side-type arrangement (∪, ∩) arranges keys to the right and left sides and any one of the upper/lower sides. The circular-type arrangement (○) arranges keys to all of the right/left sides and the upper/lower sides. Also, the square-type arrangement (□) arranges keys to all of the right/left sides and the upper/lower sides.

The controller 710 arranges several keys on the second touch-screen 772 according to the established arrangement structure (S820) and then displays the arranged keys (S830).

Further, the controller 710 determines whether a signal for changing the key-arrangement to another arrangement occurs (S840). Here, the key-arrangement change signal indicates a signal for changing arrangement locations of the plurality of keys having been arranged according to the established arrangement structure. Moreover, the key-arrangement change signal indicates a signal for changing size, shape, background-image, color, and character font of the keys. In addition, the key-arrangement change signal may be generated by the user.

If the key-arrangement change signal occurs at step S840, the controller 710 changes the key arrangement to another or different arrangement (S850). For example, the controller 710 may use a picture captured by the camera 740, images (e.g., characters, avatars, and icons) stored in the storage unit 780, or another image received over a network as the background image. The controller 710 may use the image as the key's shape. In addition, the controller 710 may directly receive a user's writing and may use the received writing as the character font.

The controller 710 may arrange only the user-selected keys from the several keys according to the established arrangement structure. In other words, the remaining keys, which are not selected by the user, are not displayed on the second touch-screen 772.

The controller 710 may replace a location of a specific key from the keys with that of another key. Here, the key movement may be executed by a pointing device according to a drag-and-drop scheme.

Further, the each positions or arrangement of keys can be changed or replaced with another key arrangement at step S850. However, the established arrangement structure is not changed or replaced with another arrangement structure at step S850.

A method for arranging keys on a touch-screen according to a second preferred embodiment of the present invention will hereinafter be described with reference to FIGS. 7 and 9.

Figure 9:
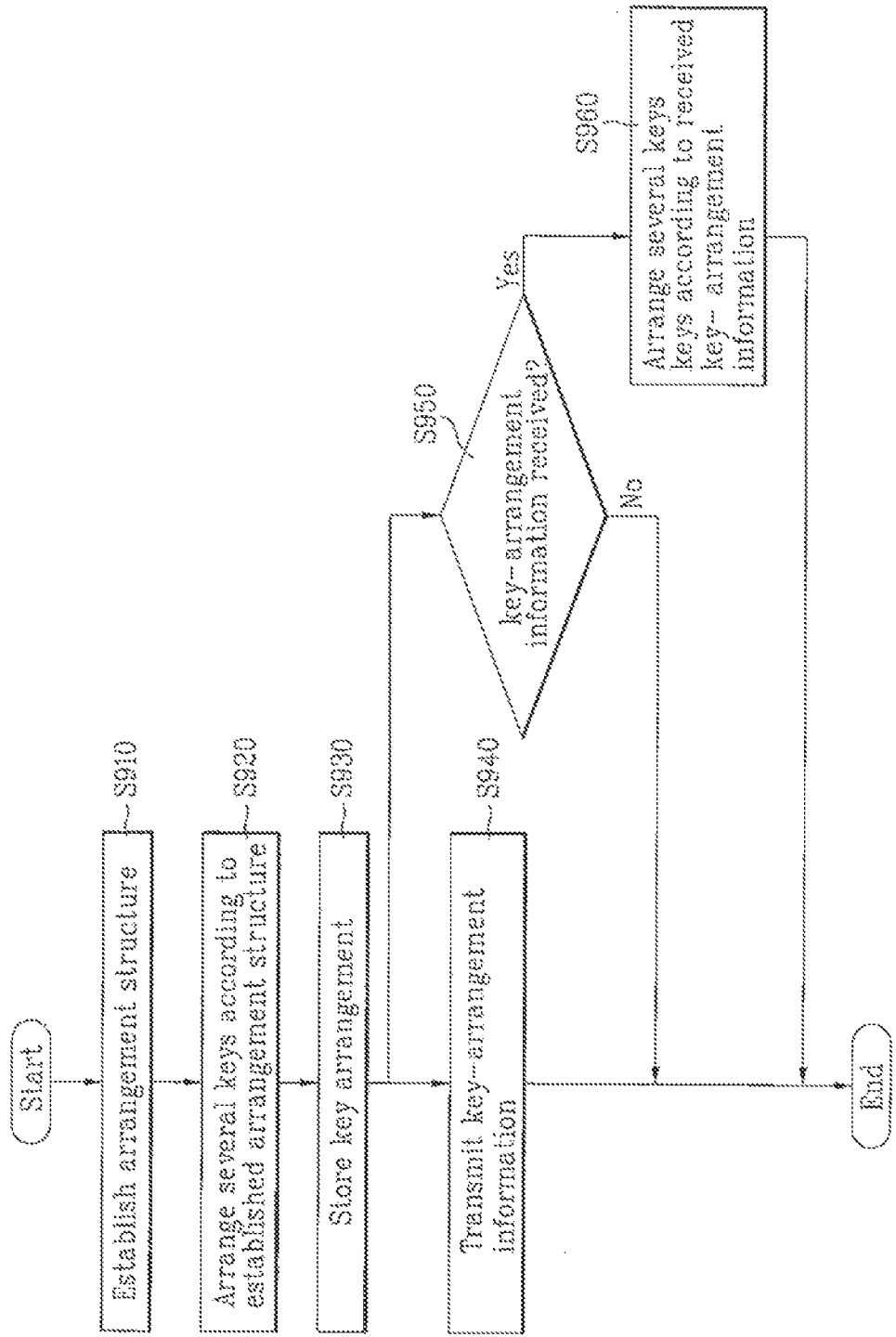
FIG. 9 is a flow chart illustrating a method for arranging keys on a touch-screen according to a second preferred embodiment of the present invention.

FIG. 9 is a flowchart illustrating a method for arranging keys on a touch-screen according to a second preferred embodiment of the present invention.

Referring to FIGS. 7 and 9, the controller 710 establishes an arrangement structure for arranging several keys on the second touch-screen 772 (S910).

Step S910 of FIG. 9 is equal to step S810 of FIG. 8, such that a detailed description of step S910 will herein be omitted for the convenience of description.

The controller 710 arranges several keys on the second touch-screen 772 according to the established arrangement structure (S920). Step S920 of FIG. 9 is equal to step S820 of FIG. 8, such that a detailed description of step S920 will herein be omitted for the convenience of description.

The storage unit 780 stores key-arrangement information according to the established arrangement structure (S930).

The RF unit 730 transmits the key-arrangement information to another terminal over a network (S940). The controller 710 then determines whether key-arrangement information from another terminal is received via the RF unit 730 (S950).

If it is determined that the key-arrangement information has been received via the RF unit 730 at step S950, the controller 710 arranges a plurality of keys on the second touch-screen 772 according to the received key-arrangement information.

A method for arranging keys on a touch-screen according to a third preferred embodiment of the present invention will hereinafter be described with reference to FIGS. 7 and 10.

Figure 10:
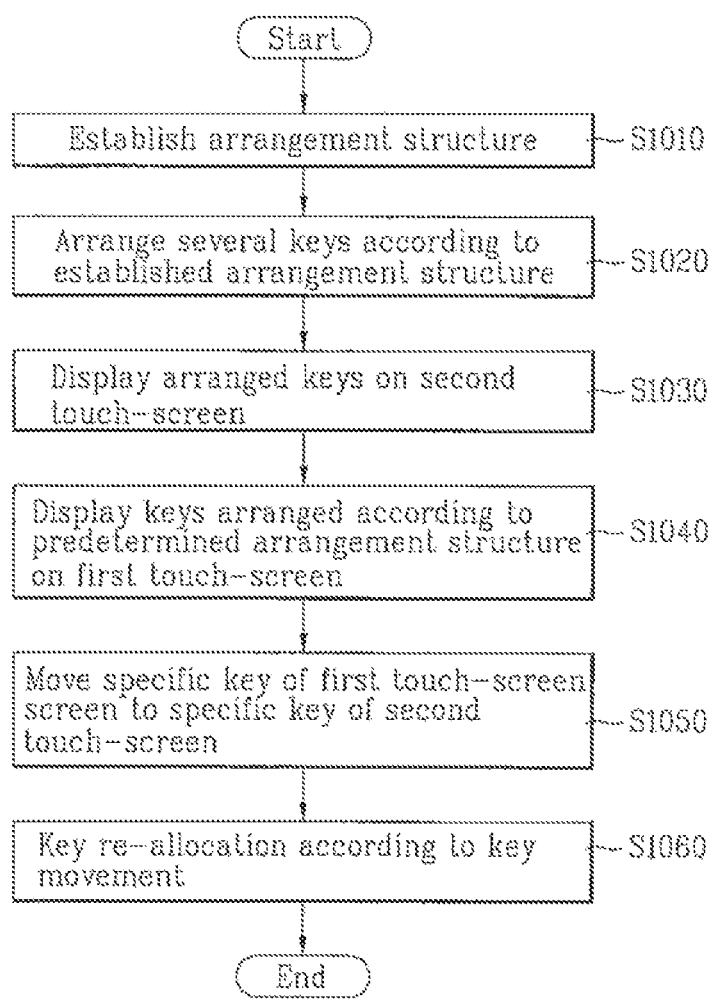
FIG. 10 is a flow chart illustrating a method for arranging keys on a touch-screen according to a third preferred embodiment of the present invention.

FIG. 10 is a flowchart illustrating a method for arranging keys on a touch-screen according to a third preferred embodiment of the present invention.

Referring to FIGS. 7 and 10, the controller 710 establishes an arrangement structure for arranging a plurality of keys on the second touch-screen 772 (S1010).

Step S1010 of FIG. 10 is equal to step S810 of FIG. 8, such that a detailed description of step S1010 will herein be omitted for the convenience of description.

The controller 710 arranges the plurality of keys on the second touch-screen 772 according to the established arrangement structure (S1020), and displays the arranged keys on the second touch-screen 772 (S1030).

Step S1020 and step S1030 of FIG. 10 are equal to step S820 and step S830 of FIG. 8, respectively, such that their detailed description will herein be omitted for the convenience of description.

The controller 710 displays keys arranged according to a predetermined arrangement structure on the first touch-screen 762 (S1040). The controller 710 then moves a specific key displayed on the first touch-screen 762 to the location of a key displayed on the second touch-screen 772 according to a user selection signal (S1050).

Here, the first touch-screen 762 and the second touch-screen 772 may be separated from each other. If necessary, the first display 760 and the second display 770 may be visually distinguished from each other on a single display.

A connection part between the first touch-screen 762 and the second touch-screen 772 maintains the movement of keys, such that the key movement between the first touch-screen 762 and the second touch-screen 772 can be made available.

Further, the controller 710 performs re-allocation of keys according to the key movement (S1060). Here, the established arrangement structure is maintained without any change and only the moved key from among the keys is changed. For example, if the moved key is a specific key of the number "1" and another key located at the arrival location of the moved key "1" indicates the key of the number "5", the "5"-key is changed to the "1"-key.

Figure 11:
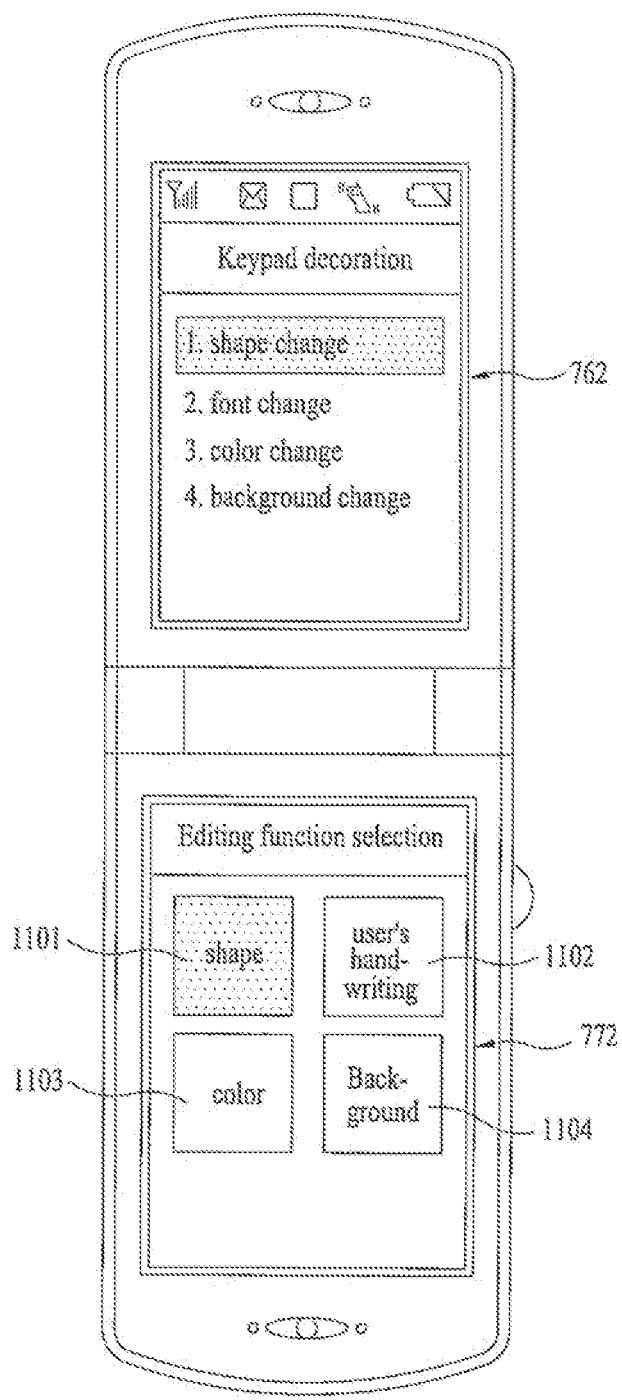
FIG. 11 exemplarily shows function menus associated with key arrangement on a touch-screen according to the present invention.

FIG. 11 exemplarily shows several function menus associated with key arrangement on a touch-screen according to the present invention.

Prior to describing FIG. 11, it is assumed that the mobile terminal according to the present invention includes a keypad decoration menu. It should be noted that most terms (e.g., menus or functions) disclosed in the present invention correspond to general terms well known in the art, but some terms have been selected by the applicant and will hereinafter be disclosed in the following description of the present invention. Therefore, it is preferable that the terms defined by the applicant be understood on the basis of their meanings in the present invention.

If the user selects the keypad decoration menu on the first touch-screen 762, the second touch-screen 772 displays a functional menu for editing a keypad screen image. The functional menu for editing the keypad screen image basically includes a first menu item 1101, a second menu item 1102, a third menu item 1103, and a fourth menu item 1104.

The first menu item 1101 allows the user to establish an arrangement structure of several keys contained in the keypad, the shape of the keys, and the size of the keys, etc. The second menu item 1102 allows the user to establish a font of characters (e.g., numbers, characters, or special characters (*, #)) to be displayed at the several keys. The third menu item 1103 allows the user to establish colors of the several keys. The fourth menu item 1104 allows the user to establish a background image of the several keys.

The menu item may further include a first selection menu (not shown) for selecting the size, shape, or background image of each key; a second selection menu (not shown) for selecting a font of characters (e.g., numbers, characters, or special characters (*, #)) to be displayed at the individual keys; and a third selection menu (not shown) for selecting a variety of handwriting types associated with the font.

Specifically, the second touch-screen 772 may display the keypad editing screen image. The first touch-screen 762 may display either explanation (or text menus) of the menu item displayed on the second touch-screen 772 or detailed menu items of the menu item.

Further, the items displayed on the first and second touch-screens 762 and 772 may be changed according to modes or operations of the mobile terminal.

A method for selecting an arrangement structure on a touch-screen according to the present invention will hereinafter be described with reference to FIGS. 12~13.

Figure 12:
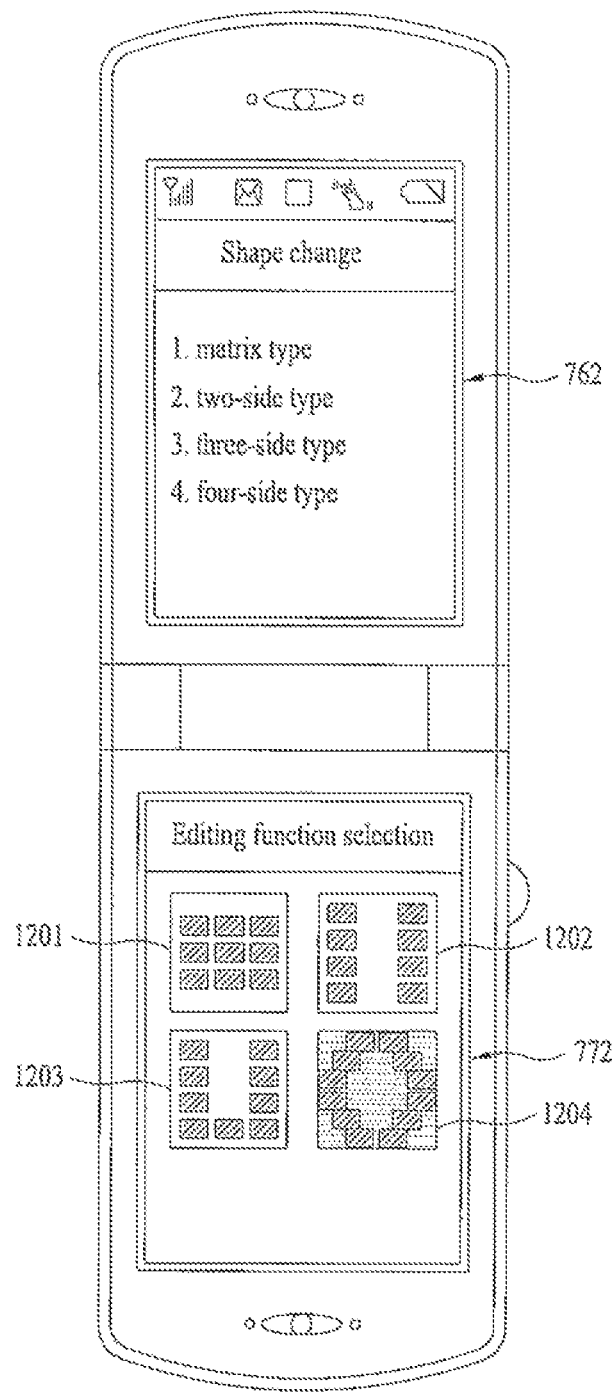
FIG. 12 exemplarily shows a process for selecting an arrangement structure on a touch-screen according to the present invention.
Figure 13:
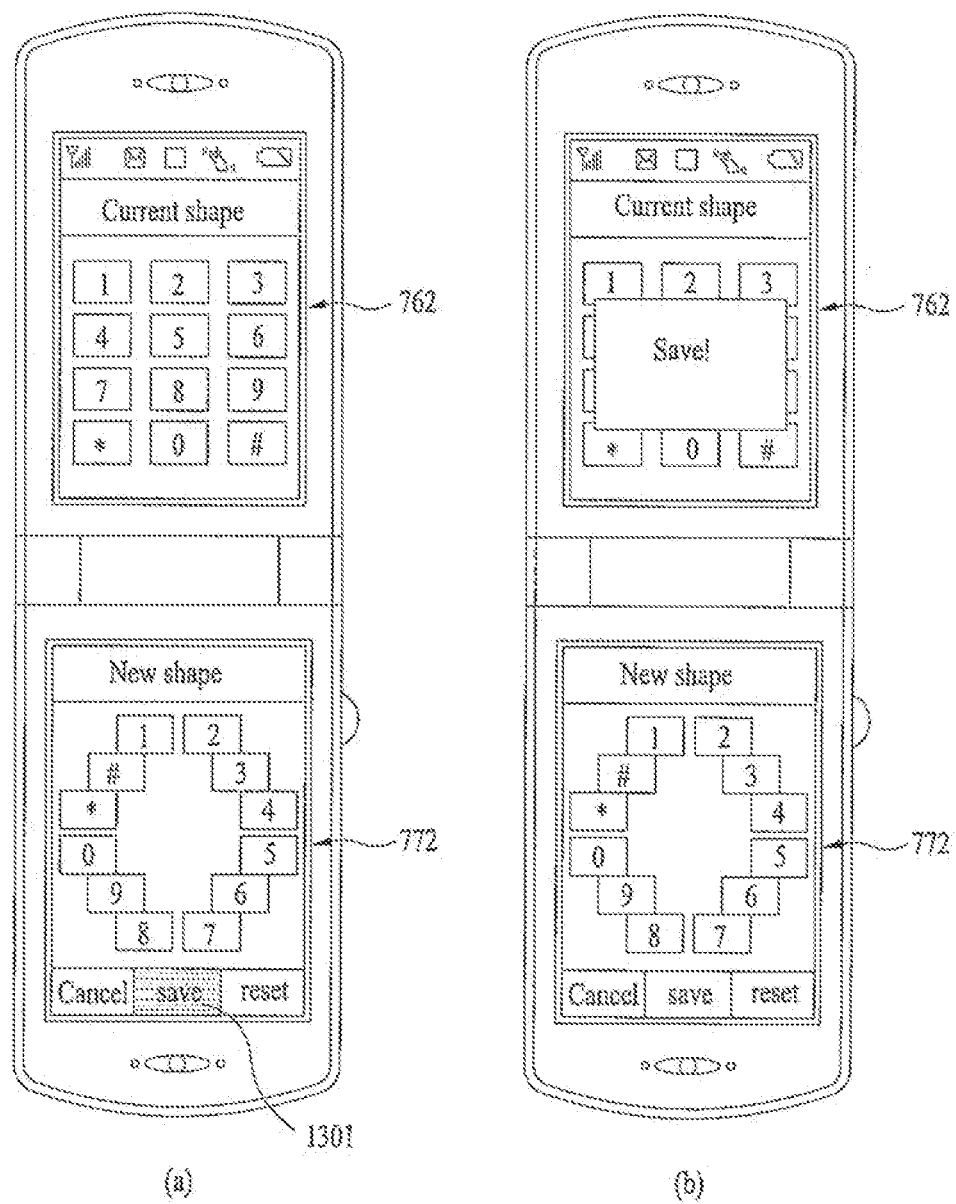
FIG. 13 exemplarily shows a process for changing an arrangement structure on a touch-screen according to the present invention.

FIG. 12 exemplarily shows a process for selecting an arrangement structure on a touch-screen according to the present invention. FIG. 13 exemplarily shows a process for changing an arrangement structure on a touch-screen according to the present invention.

Referring to FIG. 12, the arrangement structures according to the present invention include a matrix-type arrangement 1201 widely used by most mobile terminals, a two-side-type arrangement 1202, a three-side-type arrangement 1203, a circular- or square-type arrangement. The arrangement structures according to the present invention are not limited to the above-mentioned arrangement structures, and can also include other arrangements (e.g., a diamond-type arrangement, an X-shape arrangement, and an oblique-lined arrangement).

The arrangement structure may include a qwerty-key layout composed of at least one of number keys, alphabetical keys, Hangul keys, and other-language keys (not shown).

Moreover, the user may command other keys other than preferred keys not to be displayed on the touch-screen, and may command only the preferred keys to be displayed on the touch-screen.

As illustrated in FIG. 13A, the conventional matrix-type arrangement may be changed to a four-side-type arrangement.

For example, the mobile terminal may display a plurality of keys arranged according to the conventional matrix-type arrangement on the first touch-screen 762, and may display several keys arranged according to a user-desired arrangement structure on the second touch-screen 772.

If the user selects a SAVE-button 1301 located at a lower part of the second touch-screen 772, several keys having the arrangement structure of FIG. 13B are displayed.

Figure 14:
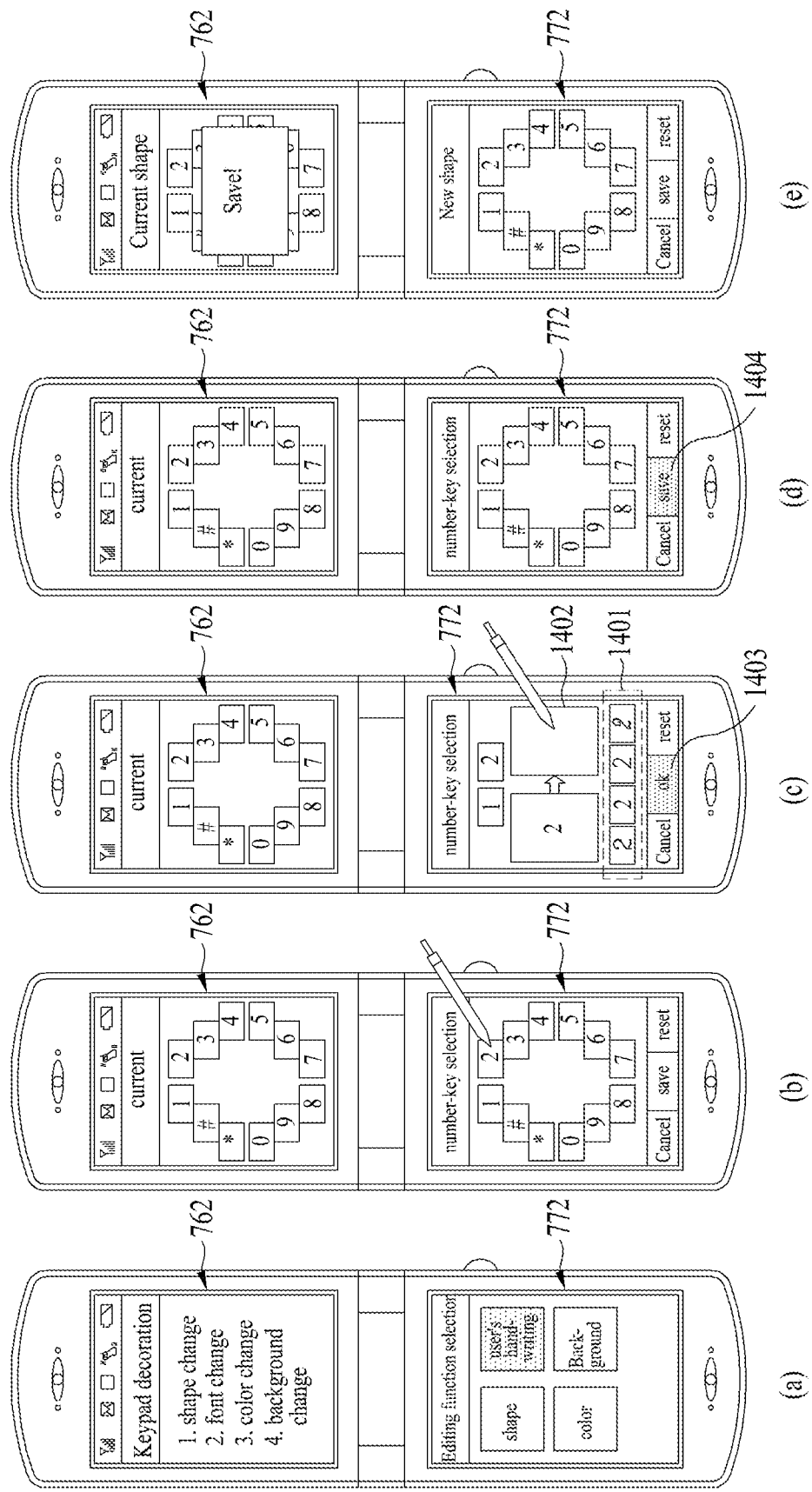
FIG. 14 exemplarily shows a process for changing key-font data displayed on a touch-screen according to the present invention.

A method for changing a font of keys on the touch-screen according to the present invention will hereinafter be described with reference to FIG. 14. FIG. 14 exemplarily shows a process for changing key-font data displayed on a touch-screen according to the present invention.

Specifically, FIG. 14 shows a process for directly receiving the user's handwriting information and applying the received handwriting information to font data.

If the font setup menu is selected by the user as shown in FIG. 14A, several keys arranged according to a currently-established arrangement structure are displayed on the first and second touch-screens 762 and 772 as shown in FIG. 14B.

If the user selects a specific key (hereinafter referred to as the "2"-key) of the number "2" from among several keys displayed on the second touch-screen 772, the "2"-key is visually enlarged on the second touch-screen 772, and at the same time, a selection window 1401 for selecting a default font and an input window 1402 for directly receiving the user's handwriting information are displayed on the second touch-screen 772, as shown in FIG. 14C.

Therefore, the user may select a default font, or may select his or her handwriting type to be font data. If the user selects a desired font or determines his or her handwriting data to be font data, the user selects the OK-button 1403 located at the lower part of the second touch-screen 772, such that the font input process is completed.

If the font input process is completed, a current image returns to the keypad editing image as shown in FIG. 14D. If the user selects the SAVE-button 1404 located at the lower part of the second touch-screen 772, a new screen image, to which the above-mentioned established font is applied, is displayed as shown in FIG. 14E.

Figure 15:
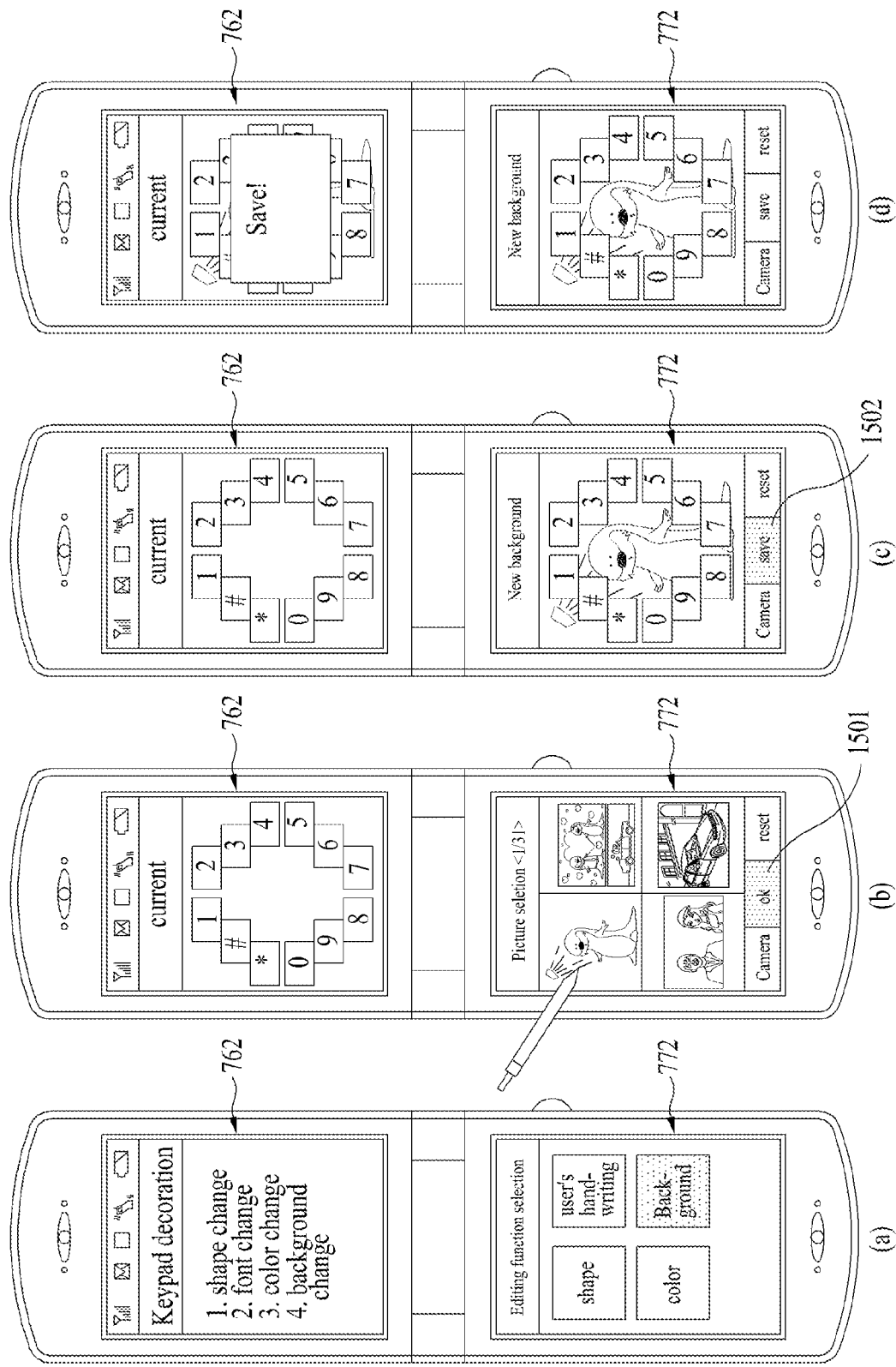
FIG. 15 exemplarily shows a process for establishing a background image of key arrangement on a touch-screen according to the present invention.

A method for establishing a background image of key arrangement on a touch-screen according to the present invention will hereinafter be described with reference to FIG. 15. FIG. 15 exemplarily shows a process for establishing a background image of key arrangement on a touch-screen according to the present invention.

If the user selects a background-setup menu as shown in FIG. 15A, the first touch-screen 762 displays a currently-used background image along with several keys, and the second touch-screen 772 displays the list of background images capable of being selected by the user as shown in FIG. 15B.

If the user selects a single background image from among the background-image list and selects the OK-button 1501 located at the lower part of the second touch-screen 772, the background-image selection process is completed.

If the background-image selection process is completed, a current image returns to the keypad editing image as shown in FIG. 15C. If the user selects the SAVE-button 1502 located at the lower part of the second touch-screen 772, a new screen image, to which the established background image is applied, is displayed as shown in FIG. 15D.

As apparent from the above description, the method for allocating/arranging keys on a touch-screen of a mobile terminal according to the present invention can allocate a plurality of keys to a plurality of sensing zones of a touch-screen in consideration of habitual- or usual-keypad usages of the user.

If the user prefers to select keys displayed on the touch-screen using his or her right hand, the present invention can establish a sensing-zone mode for allocating a sensing zone having a larger size to sensing zones located at the left column, and can allocate his or her habitual keys to some sensing zones having the largest size, resulting in greater convenience of the user who desires to select keys on the touch-screen.

If the user prefers to select keys displayed on the touch-screen using his or her left hand, the present invention can establish a sensing-zone mode for allocating a sensing zone having a larger size to sensing zones located at the right column, and can allocate his or her habitual keys to some sensing zones having the largest size, resulting in greater convenience of the user who desires to select keys on the touch-screen.

If the user prefers to select keys displayed on the touch-screen using either of the both hands, the present invention can establish a sensing-zone mode for allocating a sensing zone having a larger size to sensing zones located at the center column, and can allocate his or her habitual keys to some sensing zones having the largest size, resulting in greater convenience of the user who desires to select keys on the touch-screen.

The method for allocating/arranging keys on the touch-screen according to the present invention can measure or count the number of use frequencies with respect to the plurality of keys contained in the mobile terminal. Therefore, higher the use frequency is, larger the sensing zone.

If the mobile terminal has a feature of rotating a screen, the method for allocating/arranging keys on the touch-screen according to the present invention can change an arrangement direction of a plurality of sensing zones to be equal to an original arrangement direction, such that the user can conveniently click or press a desired key on the touch-screen, irrespective of the rotation of the screen on the mobile terminal.

The method for allocating/arranging keys on the touch-screen according to the present invention can allow a user of the mobile terminal to freely configure the shape of a keypad, such that it may provide the user with unique interest and convenience of use.

If the user's mobile terminal seems tedious to the user, the method for allocating/arranging keys on the touch-screen according to the present invention allows the user to freely change a current keypad image to a new keypad image, such that the user cannot lose interest in using his or her mobile terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for changing displayed key characteristics on a touch a mobile terminal, the method comprising:
    displaying a key characteristic menu on a first touch screen, wherein the menu includes a plurality of user-selectable options for modifying a first key group that includes a plurality of keys, wherein the user-selectable options of the menu include key arrangement and key background;
    displaying a key arrangement modification menu on a second touch screen in response to user selection of the key arrangement option of the key characteristic menu, wherein the key arrangement modification menu includes a plurality of templates, wherein each template of the plurality of templates graphically depicts a different spatial arrangement for the displaying of keys;
    identifying a selected template of the plurality of templates in response to user selection with regard to the displayed key arrangement modification menu;
    displaying the keys of the first key group according to a first spatial arrangement on the first touch screen;
    displaying keys of a second key group according to a spatial arrangement of the selected template on the second touch screen, wherein the keys of the first key group and the keys of the second key group are the same but are displayed in different spatial arrangements such that the first spatial arrangement is different from the spatial arrangement of the selected template;
    modifying key allocation of the keys of the second key group by changing any key of the keys of the second key group in response to user input, wherein a key of the second key group is changed by a touch input moving a key of the first key group to a changed key of the second key group;
    displaying the keys of the second key group on the second touch screen according to the modified key allocation and the selected template;
    displaying a key background menu on the second touch screen in response to user selection of the key background option of the key characteristic menu, wherein the key background menu includes a plurality of images for use as background for the keys of the second key group;
    associating a selected image of the plurality of images with the keys of the second key group in response to user selection with regard to the displayed key background menu, wherein the selected image is displayed as a background image only when the keys of the second key group are displayed;
    storing the modified key allocation, the selected template, and the selected image; and
    transmitting the modified key allocation, the selected template, and the selected image to another mobile terminal to permit the another mobile terminal to apply the modified key allocation, the selected template, and the selected image to a key group of the another mobile terminal.

2. The method of claim 1, wherein the plurality of templates includes at least one template having at least a matrix-shape key arrangement, a two-sided-shape key arrangement, a three-sided-shape key arrangement, a circular-shape key arrangement, or a square-shape key arrangement.

3. The method of claim 1, wherein the first touch screen and the second touch screen are separated by a connection portion configured to indicate a movement of a key being moved from the first key group on the first touch screen to the second key group on the second touch screen.

4. The method of claim 1, wherein a size and shape of one or more keys in each of the plurality of templates are selectable by a user.

5. The method of claim 1, wherein the first key group and the second key group each display only a plurality of preferred keys indicated by the user as preferred keys.

6. The method of claim 1, wherein the first key group and the second key group each display all keys of each respective key group except one or more non-preferred keys indicated by the user as non-preferred keys.

7. A mobile terminal, comprising:
    a first touch screen and a second touch screen each configured to display information and receive inputs;
    a memory unit configured to store information;
    a wireless communication unit configured to transmit information; and
    a controller configured to:
        cause the first touch screen to display a key characteristic menu which includes a plurality of user-selectable options for modifying a first key group that includes a plurality of keys, wherein the user-selectable options of the menu include key arrangement and key background;

cause the second touch screen to display a key arrangement modification menu in response to user selection of the key arrangement option of the key characteristic menu, wherein the key arrangement modification menu includes a plurality of templates, wherein each template of the plurality of templates graphically depicts a different spatial arrangement for the displaying of keys;

identify a selected template of the plurality of templates in response to user selection with regard to the displayed key arrangement modification menu;

cause the first touch screen to display the keys of the first key group according to a first spatial arrangement;

cause the second touch screen to display keys of a second key group according to a spatial arrangement of the selected template, wherein the keys of the first key group and the keys of the second key group are the same but are displayed in different spatial arrangements such that the first spatial arrangement is different from the spatial arrangement of the selected template;

modify key allocation of the keys of the second key group by changing any key of the keys of the second key group in response to user input, wherein a key of the second key group is changed by an input received by the touch screen moving a key of the first key group to a changed key of the second key group;

cause the second touch screen to display the keys of the second key group according to the modified key allocation and the selected template;

cause the second touch screen to display a key background menu in response to user selection of the key background option of the key characteristic menu, wherein the key background menu includes a plurality of images for use as background for the keys of the second key group;

associate a selected image of the plurality of images with the keys of the second key group in response to user selection with regard to the displayed key background menu, wherein the selected image is displayed as a background image only when the keys of the second key group are displayed;

cause the memory unit to store the modified key allocation, the selected template, and the selected image; and cause the wireless transmission unit to transmit the modified key allocation, the selected template, and the selected image to another mobile terminal to permit the another mobile terminal to apply the modified key allocation, the selected template, and the selected image to a key group of the another mobile terminal.

8. The mobile terminal of claim 7, wherein the plurality of templates includes at least one template having at least a matrix-shape key arrangement, a two-sided-shape key arrangement, a three-sided-shape key arrangement, a circular-shape key arrangement, or a square-shape key arrangement.

9. The mobile terminal of claim 7, further comprising a connection portion, wherein the first touch screen and the second touch screen are separated by the connection portion, and the controller is further configured to cause the connection portion to indicate a movement of a key being moved from the first key group on the first touch screen to the second key group on the second touch screen.

10. The mobile terminal of claim 7, wherein the controller is further configured to change a size and shape of one or more keys in each of the plurality of templates in response to a user input.

11. The mobile terminal of claim 7, wherein the controller is further configured to:

cause the touch screen to display each of the first key group and the second key group with only a plurality of preferred keys indicated as preferred keys in response to a user input.

12. The mobile terminal of claim 7, wherein the controller is further configured to:

cause the touch screen to display each of the first key group and the second key group with all keys of each respective key group except one or more non-preferred keys indicated as non-preferred keys in response to a user input.

* * * * *